(12) United States Patent
Parias

(10) Patent No.: US 7,768,409 B2
(45) Date of Patent: Aug. 3, 2010

(54) EMBEDDED RFID SCANNER FOR MOBILE PRODUCT MANAGEMENT

(75) Inventor: Thomas Parias, Croisy-sur-Seine (FR)

(73) Assignee: American Air Liquide, Inc., Fremont, CA (US)

( * ) Notice: Subject to any disclaimer, the term of this patent is extended or adjusted under 35 U.S.C. 154(b) by 972 days.

(21) Appl. No.: 11/422,002

(22) Filed: Jun. 2, 2006

(65) Prior Publication Data
US 2007/0008152 A1    Jan. 11, 2007

Related U.S. Application Data

(60) Provisional application No. 60/689,637, filed on Jun. 10, 2005.

(51) Int. Cl.
*G08B 23/00* (2006.01)
(52) U.S. Cl. .............. 340/573.1; 340/572.1; 340/572.8; 340/539.1; 705/28
(58) Field of Classification Search .............. 340/573.1, 340/572.1–572.9, 10.1, 539.1, 573.5, 505, 340/568.1; 235/385, 426.44, 472, 380; 705/22, 705/23, 28
See application file for complete search history.

(56) References Cited

U.S. PATENT DOCUMENTS

| | | | | |
|---|---|---|---|---|
| 6,049,327 A | * | 4/2000 | Walker et al. | 345/158 |
| 7,032,814 B2 | * | 4/2006 | Blankenship | 235/375 |
| 7,151,979 B2 | * | 12/2006 | Andersen et al. | 700/214 |
| 2004/0206824 A1 | | 10/2004 | Lapstun et al. | |
| 2006/0044112 A1 | * | 3/2006 | Bridgelall | 340/10.1 |

FOREIGN PATENT DOCUMENTS

| JP | 2002352200 A | 12/2002 |
|---|---|---|
| WO | 0992017/9900755 | 1/1999 |

\* cited by examiner

*Primary Examiner*—Anh V La
(74) *Attorney, Agent, or Firm*—Donna Blalock Holguin

(57) ABSTRACT

The present invention generally provides methods and systems for reading information from a signal-emitting device, such as a wireless identification tag. In one embodiment, the method includes providing an electronic reading device mounted to a body-worn harness adapted to be worn on a body of a user. The method further includes detecting a predefined physical configuration assumed by at least a portion of the body by determining that a pressure value measured via a pressure sensor connected to the body-worn harness is above a threshold pressure value. In response to detecting the predefined physical configuration, the electronic reading device is activated. Upon being activated, the electronic reading device is configured to receive a signal from the signal-emitting device, the signal containing data pertaining to a physical object associated with the signal-emitting device.

42 Claims, 11 Drawing Sheets

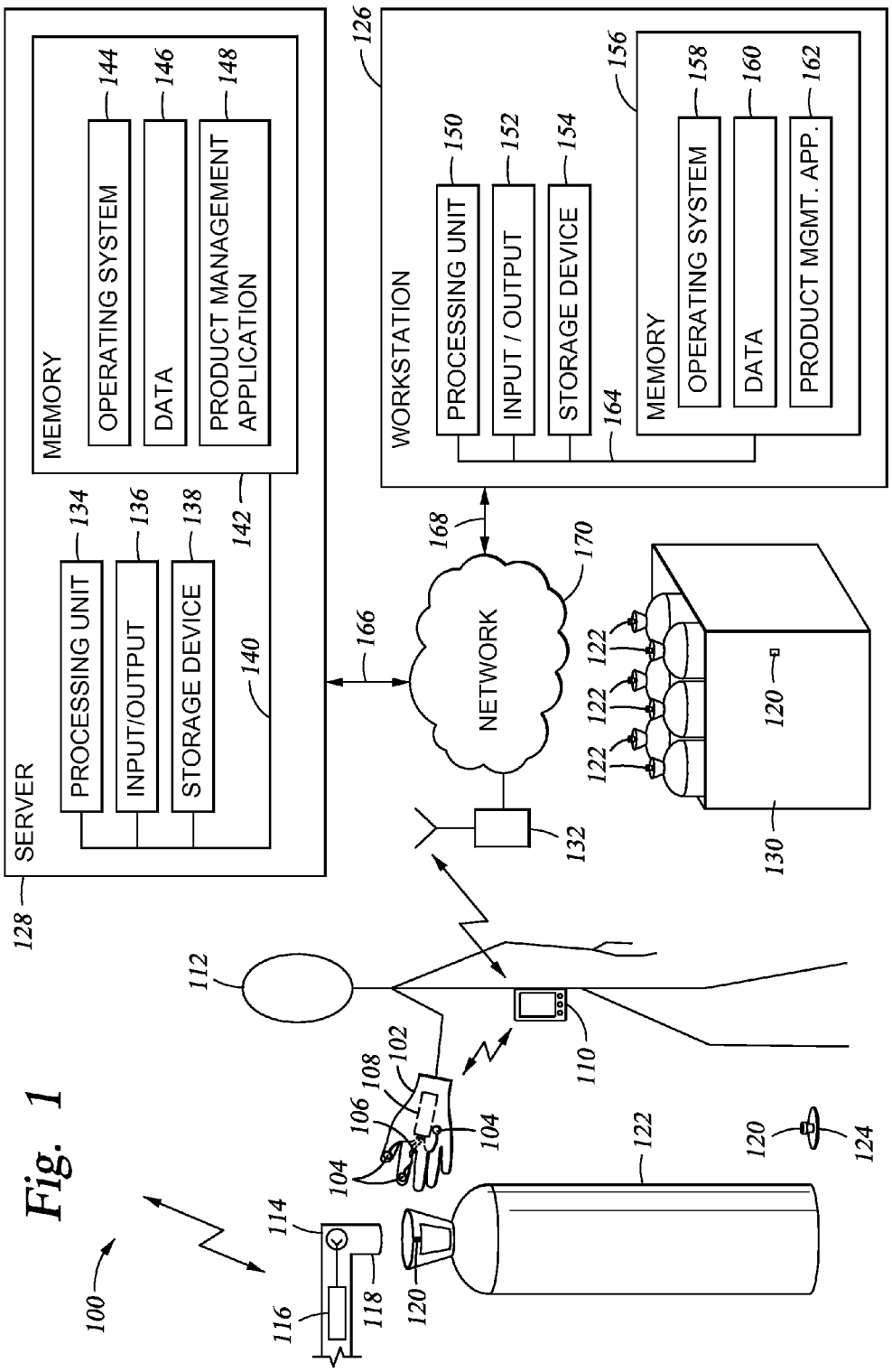

| TAG ID NUMBER | CYLINDER IDENTIFICATION NUMBER | DATE REFILLED | TYPE OF GAS | QUALITY OF GAS | GAS CYLINDER TEST DATE | ... |
|---|---|---|---|---|---|---|
| . . . | | | | | | |

Fig. 10

EMBEDDED RFID SCANNER FOR MOBILE PRODUCT MANAGEMENT

CROSS-REFERENCE TO RELATED APPLICATIONS

This application claims the benefit under 35 U.S.C. §119(e) to provisional application No. 60/689,637, filed Jun. 10, 2005, the entire contents of which are incorporated herein by reference.

BACKGROUND

In modern corporations with large distribution systems, managing products in the distribution system is typically a complex endeavor. Where corporations distribute a reusable product, collection and reprocessing of that product may further add complexity to what may be an already complex system. Keeping track of the products within a distribution system typically requires efficient data collecting and record keeping and an efficient way of storing such information.

Some corporations utilize various technologies to improve product management in large distribution systems. For example, some corporations may use barcodes and other corporations may use machine readable tags such as Radio Frequency Identification (RFID) tags to track products in their distribution system. RFID tags may be wirelessly read when the RFID tag is brought into proximity with an RFID reader. Wirelessly reading RFID tags may allow information about the tagged product to be quickly obtained and processed.

There are generally less constraints upon reading a RFID tag than reading a barcode (e.g., direct line of sight between the barcode and the barcode reader), therefore using RFID tags in a situation where barcodes would suffice may save time. But, in some cases, wirelessly reading RFID tags may still be a time consuming process. For example, in situations where large numbers of products are being scanned, a worker may individually locate and scan the RFID tag on each product. The repetitive nature of this process may cause significant delays while each RFID tag is scanned and may be subject to human error (e.g., if the worker forgets to turn the RFID reader on, or if the worker accidentally omits scanning one or more items).

Accordingly, what is needed is an improved method and apparatus for wirelessly reading machine readable tags.

SUMMARY

The present invention generally provides methods and systems for reading information from a signal-emitting device, such as a wireless identification tag. In one embodiment, the method includes providing an electronic reading device mounted to a body-worn harness adapted to be worn on a body of a user. The method further includes detecting a predefined physical configuration assumed by at least a portion of the body by determining that a pressure value measured via a pressure sensor connected to the body-worn harness is above a threshold pressure value. In response to detecting the predefined physical configuration, the electronic reading device is activated. Upon being activated, the electronic reading device is configured to receive a signal from the signal-emitting device, the signal containing data pertaining to a physical object associated with the signal-emitting device.

In one embodiment, a method for reading a wireless identification tag may include measuring a pressure value via a pressure sensor connected to a hand-mounted device. If the pressure value measured via the pressure sensor is above a threshold pressure value, then the method may also include wirelessly reading tag data from the wireless identification tag via an antenna connected to the hand-mounted device.

In one embodiment, a tangible computer-readable medium containing a program product may be provided. When executed by a processor, the program product may perform an operation which may include measuring a pressure value via a pressure sensor connected to a hand-mounted device. If the pressure value measured via the pressure sensor is above a threshold pressure value, then the operation may also include wirelessly reading tag data from the wireless identification tag via an antenna connected to the hand-mounted device.

In one embodiment, a device may include a hand-mounted device with an antenna, a pressure sensor connected to the hand-mounted device, and circuitry. The circuitry may be configured to perform an operation which may include measuring a pressure value via the pressure sensor connected to the hand-mounted device. If the pressure value measured via the pressure sensor is above a threshold pressure value, then the operation may also include wirelessly reading tag data from the wireless identification tag via an antenna connected to the hand-mounted device.

In one embodiment, a method for product management may include wirelessly reading tag data from an identification tag using a hand-mounted identification tag reader. The tag data may be transmitted from the hand-mounted identification tag reader to a first computing system. The first computing system may be configured to receive additional tag information corresponding to the tag data from a user.

In one embodiment, a method for product management may include activating a hand-mounted wireless identification tag reader in response to a pressure exerted against a pressure sensor of the hand-mounted wireless identification tag reader. The activated hand-mounted wireless identification tag reader may wirelessly read identification tag data from an identification tag located in a handle portion of a product.

In one embodiment, a device may include a hand-mounted device for reading a wireless identification tag. The device may also include an antenna connected to the hand-mounted device for performing communication with the wireless identification tag. The antenna may be positioned between a first digit of a user's hand and a second digit of the user's hand.

In one embodiment, a hand-mounted device may include a hand sensor, a wireless tag reader, and circuitry. The circuitry may be configured to perform an operation which may include determining, using the hand sensor, whether a user is wearing the hand-mounted device. If the user is wearing the hand-mounted device, the operation may include activating the wireless tag reader. The activated wireless tag reader may be configured to read wireless tag data from a wireless identification tag placed within a threshold distance from the wireless tag reader.

In one embodiment, a hand-mounted device may include a pressure sensor mounted on one or more of the digits of a hand of a user, a wireless tag reader, and circuitry configured to perform an operation. The operation may include measuring a pressure value via the pressure sensor, determining if the pressure value measured via the pressure sensor is above a threshold pressure value, and, if so, reading wireless tag data from a wireless identification tag.

In one embodiment, a device may include a hand-mounted device for reading a wireless identification tag and circuitry. The circuitry may be configured to receive tag data from a wireless identification tag via the hand-mounted device and combine the tag data in a data entry that may include an identification of a user of the hand-mounted device.

BRIEF DESCRIPTION OF THE DRAWINGS

For a further understanding of the nature and objects of the present invention, reference should be made to the following detailed description, taken in conjunction with the accompanying drawings, in which like elements are given the same or analogous reference numbers and wherein:

FIG. 1 is a block diagram which illustrates a system according to one embodiment of the invention;

FIG. 10 illustrates a database containing information that may be stored for a wirelessly readable electronic tag according to one embodiment of the invention.

DESCRIPTION OF PREFERRED EMBODIMENTS

Figure 2A:
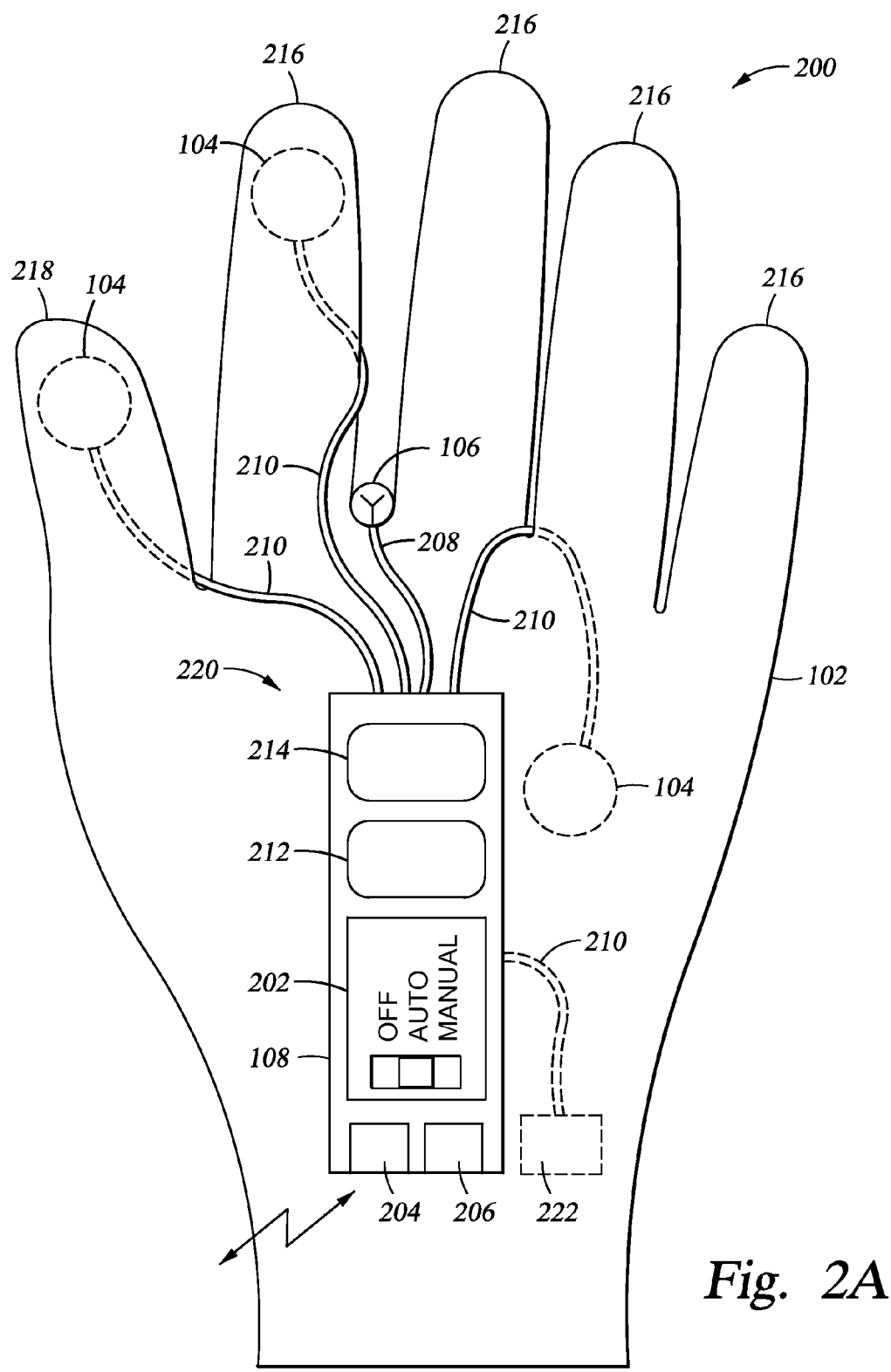
FIG. 2A is a block diagram which illustrates a back side of a glove for wirelessly reading a wireless identification tag according to one embodiment of the invention.

The present invention generally provides methods and systems for reading information from a signal-emitting device, such as a wireless identification tag. In one embodiment, the method includes providing an electronic reading device mounted to a body-worn harness adapted to be worn on a body of a user. The method further includes detecting a predefined physical configuration assumed by at least a portion of the body by determining that a pressure value measured via a pressure sensor connected to the body-worn harness is above a threshold pressure value. In response to detecting the predefined physical configuration, the electronic reading device is activated. Upon being activated, the electronic reading device is configured to receive a signal from the signal-emitting device, the signal containing data pertaining to a physical object associated with the signal-emitting device.

In the following, reference is made to embodiments of the invention. However, it should be understood that the invention is not limited to specific described embodiments. Instead, any combination of the following features and elements, whether related to different embodiments or not, is contemplated to implement and practice the invention. Furthermore, in various embodiments the invention provides numerous advantages over the prior art. However, although embodiments of the invention may achieve advantages over other possible solutions and/or over the prior art, whether or not a particular advantage is achieved by a given embodiment is not limiting of the invention. Thus, the following aspects, features, embodiments and advantages are merely illustrative and are not considered elements or limitations of the appended claims except where explicitly recited in a claim(s). Likewise, reference to "the invention" shall not be construed as a generalization of any inventive subject matter disclosed herein and shall not be considered to be an element or limitation of the appended claims except where explicitly recited in a claim(s).

System Overview

One embodiment of the invention is implemented as a program product for use with a computer system such as, for example, the system 100 shown in FIG. 1 and described below. The program(s) of the program product defines functions of the embodiments (including the methods described herein) and can be contained on a variety of computer-readable media. Illustrative computer-readable media include, but are not limited to: (i) information permanently stored on non-writable storage media (e.g., read-only memory devices within a computer such as CD-ROM disks readable by a CD-ROM drive); (ii) alterable information stored on writable storage media (e.g., floppy disks within a diskette drive or hard-disk drive); and (iii) information conveyed to a computer by a communications medium, such as through a computer or telephone network, including wireless communications. The latter embodiment specifically includes information downloaded from the Internet and other networks. Such computer-readable media, when carrying computer-readable instructions that direct the functions of the present invention, represent embodiments of the present invention.

In general, the routines executed to implement the embodiments of the invention, may be part of an operating system or a specific application, component, program, module, object, or sequence of instructions. The computer program of the present invention typically is comprised of a multitude of instructions that will be translated by the native computer into a machine-readable format and hence executable instructions. Also, programs are comprised of variables and data structures that either reside locally to the program or are found in memory or on storage devices. In addition, various programs described hereinafter may be identified based upon the application for which they are implemented in a specific embodiment of the invention. However, it should be appreciated that any particular program nomenclature that follows is used merely for convenience, and thus the invention should not be limited to use solely in any specific application identified and/or implied by such nomenclature.

In one embodiment of the invention, the system 100 may include a wireless identification tag reader/writer module 108 attached to or embedded, for example, in a glove 102 or other wearable item. In one embodiment, the glove 102 or other wearable item may also include one or more pressure sensors 104, and/or an antenna 106 for communication with a wireless identification tag 120. The reader/writer module 108 may be configured to read wireless identification tag data from the wireless identification tag 120 located on a product, such as a gas cylinder 122 or a rack of gas cylinders 130, as depicted in FIG. 1.

In one embodiment, a wireless identification tag reader/writer 116 may also be used to read wireless identification tag data via an antenna 114 built into a nozzle 118 used when filling a gas cylinder 122. The wireless identification tag reader/writer 116 and antenna 114 and/or the reader/writer module 108 attached to the glove 102 may also be used to write information to the wireless identification tag 120 such as the gas cylinder fill date, gas quality, gas type, and gas cylinder test date.

The system 100 may transmit the wireless identification tag data read by the reader/writer module 108 to a portable computing device 110. The wireless identification tag data may, for example, be transmitted via a wireless or a wired connection. The portable computing device 110 may include a mobile phone, a tablet computer, or a personal digital assistant (PDA). As depicted, the portable computing device 110 may be worn by the user 112 of the glove 102. As will be described further in relation to FIGS. 8 and 9, a user 112 of the portable computing device 110 may enter additional information corresponding to the wireless identification tag 120 for the gas cylinder 122 into the portable computing device 110.

The portable computing device 110 may be configured to transmit the received wireless identification tag data and any additional information entered by the user 112 to a central database server 128, workstation computer 126, or another type of computing device. For example, a wireless interface 132 may be used to transmit the wireless identification tag data as well as the additional information input by the user to the network 170 via a wireless communication protocol, such as IEEE 802.11, Global System for Mobile Communications (GSM), or Bluetooth. Alternatively, the connection may be wired. Once on the network 170, the wireless identification tag data and the additional information may be transferred a central database server 128.

In one embodiment, processing in the central database server 128 may be performed by a processing unit 134. The processing unit 134 may process programs in a memory 142 including a product management application 148 and an operating system 144 for the central database server 128. The processing unit 134 may also process data 146 and other programs or information. Such data and programs may also be stored in a storage device 138 such as a hard drive or other computer-readable medium (e.g., a compact disc or read-only memory). The central database server 128 may utilize an input/output interface 136 to request and/or receive data from the network 170 via a network link 166. Internal components of the central database server 128 may communicate via a data bus 138.

A workstation 126 may be used to access the central database server 128 over the network 170 and view the information about the gas cylinder 122 sent from the portable computing device 110 to the central database server 128. In one embodiment, processing in the workstation computer 126 may be performed by a processing unit 150. The processing unit 150 may process programs in a memory 156 including a product management application 162 and an operating system 158 for the workstation computer 126. The processing unit 150 may also process data 160 and other programs or information. Such data and programs may also be stored in a storage device 152 such as a hard drive or other computer-readable medium (e.g., a compact disc or read-only memory). The workstation computer 126 may utilize an input/output interface 152 to request and/or receive data from the network 170 via a network link 168. Internal components of the workstation computer 126 may communicate via a data bus 164.

Glove for Wirelessly Reading a Wireless Identification Tag

Figure 2B:
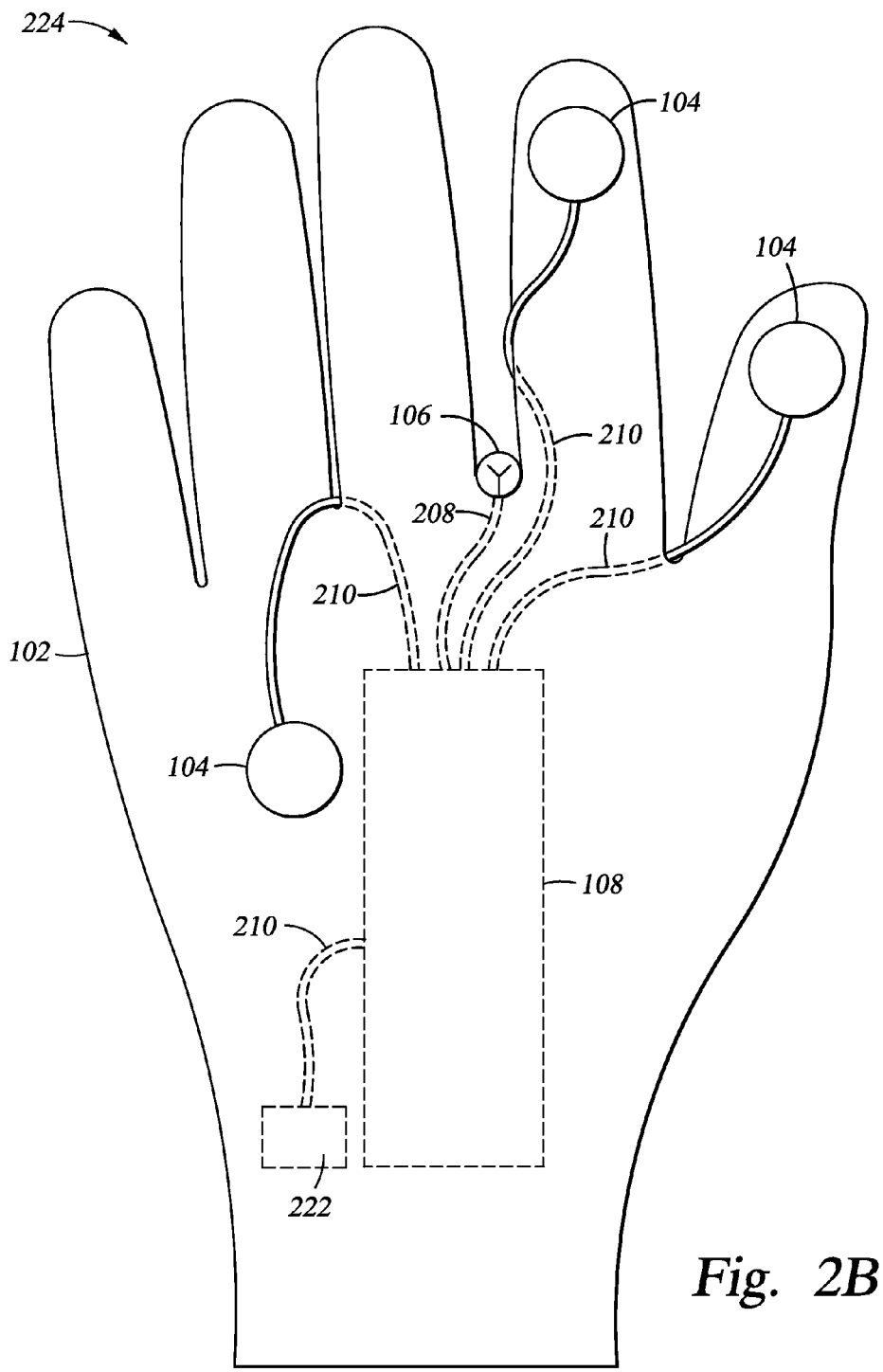
FIG. 2B is a block diagram which illustrates a front side of the glove for wirelessly reading the wireless identification tag according to one embodiment of the invention.

FIG. 2A is a block diagram which illustrates a back side (e.g., viewed from a back of a hand) of the glove 200 for wirelessly reading a wireless identification tag 120 according to one embodiment of the invention, and FIG. 2B is a block diagram which illustrates a front side (e.g., viewed from a palm of the hand) of the glove 224 for wirelessly reading a wireless identification tag 120 according to one embodiment of the invention. As described above, the glove 102 may include one or more pressure sensors 104, an antenna 106 for communicating with the wireless identification tag 120, and a reader/writer module 108.

Furthermore, the reader/writer module 108 may also contain a battery 212, a power port 206 for charging the battery 212, reader/writer module control circuitry 214, and a switch 202 for setting the glove 102 to off, to automatic read, or to manual read. The glove 102 may have a sensor 222 for determining whether or not a hand is in the glove 102. The switch 202 and the hand sensor 222 may be connected to the reader/writer module 108 via connection wires 210.

In one embodiment, the glove 102 may be a work glove, such as a safety glove which may be used for safety in a given industry. For example, the glove 102 may be insulating so that its wearer's hand is protected from extreme temperatures, may have no fingertips so that its wearer may feel the texture of an object while wearing the glove, or may be a lightweight glove completely covering the hand used when moving products at a distribution center.

In one embodiment, the reader/writer module 108 may be located on the back side of the glove 102. The reader/writer module 108 may be configured to measure a pressure value from the pressure sensor 104, control the reading operation of the reader/writer module control circuitry 214 using antenna 106, and transmit the information read from the wireless identification tag 120 to a portable computing device 110 via a transceiver 204 that may use wired or wireless communication.

In one embodiment, the reader/writer module 108 on or in the glove 102 may be used to read data from a tag when a product is grasped or handled with the glove 102. For example, the pressure sensor 104 may be used to determine when a handle on a product is being grasped.

In one embodiment, the pressure sensor 104 may be a pressure sensor capable of measuring a range of pressures, e.g., a piezoelectric sensor. The reader/writer module control circuitry 214 may obtain from the pressure sensor 104 a measured pressure value. In one embodiment, the reader/writer module control circuitry 214 may activate the antenna 106 to read a wireless identification tag 120 when the measured pressure value is above a threshold pressure value. (For example, a pressure value which may indicate that a product is being grasped.) By activating the antenna 106 when a product is being grasped, battery life of the battery 212 may be conserved because the pressure sensor 104 may be used to regulate the activation of the antenna 106 so that it is not continually active.

Furthermore, by placing the wireless identification tag 120 in a position on a product where the product is likely to be grasped, and by activating the antenna 106 when the product is grasped, the reader/writer module 108 may have an improved opportunity to successfully read the wireless identification tag 120 during a read or write operation.

In another embodiment, the pressure sensor 104 may be a pressure sensor that detects only whether or not it is being pressed, e.g., a pushbutton. This may enable the reader/writer module control circuitry 214 to determine whether or not there is a pressure on the pressure sensor 104. Thus, in one embodiment, the reader/writer module control circuitry 214 may activate the antenna 106 to read a wireless identification tag 120 only when there is a pressure on the pressure sensor, which in turn may aid in conservation of battery life of the battery 212 of the reader/writer module 108, as described above.

In one embodiment, the pressure sensor 104 may be located at the ends of one or more fingers 216 and/or the thumb 218 (collectively the digits), and/or in the palm 220 of the glove 102. This configuration may be beneficial in product management because it may allow for reading of the wireless identification tag 120 only when a predefined body configuration, like grasping or lifting, is detected as a pressure on the pressure sensor 104. Optionally, the pressure sensor 104 may be located anywhere else on the user 112. The pressure sensor 104 may be connected to the reader/writer module 108 via connection wires 210. In one embodiment, the connection wires 210 may include a twisted pair of wires to reduce induction between the wires.

In one embodiment, the antenna 106 may be located between a first and second finger 216 of the glove 102. In one embodiment, the antenna 106 may be a directional antenna. By placing the antenna 106 between a first and second finger 216 of the glove 102, the antenna may be positioned to measure the wireless identification tag 120 when it is in close proximity to a hand of a user 112. This configuration may be beneficial in product management because it may allow for seamless reading of the wireless identification tag 120 when the user 112 handles a product as described above. Optionally, the antenna 106 may be located anywhere else on the user 112. For example, the antenna 106 may be connected to the reader/writer module 108 via a connection 208. In one embodiment, the connection 208 may include a twisted pair of wires to reduce induction between the wires.

In one embodiment, the switch 202 may be used to select one three operating modes of the reader/writer module 108. If the switch is in the off position, the reader/writer module 108 is off, no pressure is being detected, and no read operation may be performed. If the switch is in the manual position, the reader/writer module 108 may be activated, and read operations may be continually occurring regardless of detection of pressure by the pressure sensor 104. If the switch is in the automatic position, the reader/writer module 108 may be activated, detection of pressure by the pressure sensor 104 may take place, and read operations may occur if the pressure sensor 104 detects a pressure on the sensor.

In one embodiment, the reader/writer module 108 may provide auditory feedback to the user 112 when wireless identification tag data is received. For example, the auditory feedback may be a short tone signifying a successful read of a wireless identification tag 120, or may be speech identifying the read operation and details about the wireless identification tag 120. Such feedback may enable the user 112 to more quickly identify misreads and correct errors as they occur.

As described above, the glove 102 may include a sensor 222 which may be used to detect the hand of the user 102 (e.g., to detect when the glove is being worn). In one embodiment, the sensor 222 may work in conjunction with the switch 202. For example, in one embodiment, the reader/writer module 108 may only be used for reading or writing when the sensor 222 detects that there is a hand in the glove 102 and when the switch 202 is not in the off position. As described above, such reading and writing may further depend on whether the pressure sensor 104 detects a pressure.

In another embodiment, the sensor 222 may replace the function of the off position of the switch 202. For example, the switch 202 may have two positions: automatic read and manual read. When a user's hand is detected in the glove 102 by sensor 222, the reader/writer module 108 may be automatically activated. When the reader/writer module 108 is activated, the reader/writer module control circuitry 214 may automatically monitor the pressure sensor to determine whether to activate the antenna 106 as described below.

In another embodiment, the sensor 222 may replace the switch 202. For example, when a user's hand is detected in the glove 102 by sensor 222, the reader/writer module 108 may be automatically activated. When the reader/writer module 108 is activated, the reader/writer module control circuitry 214 may automatically monitor the pressure sensor to determine whether to activate the antenna 106 as described below.

Figure 3:
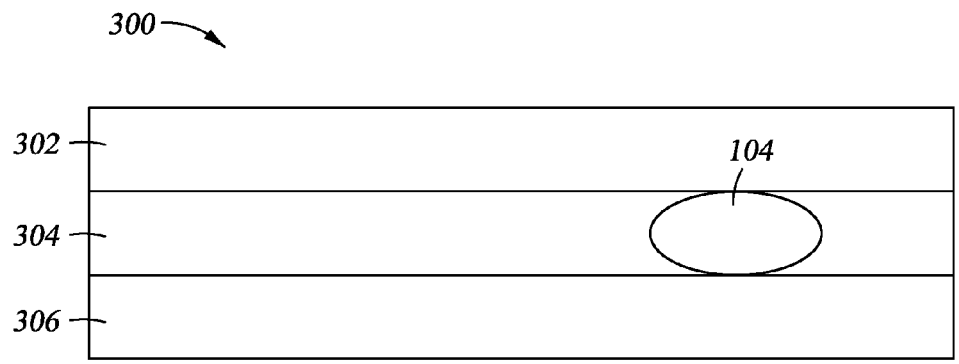
FIG. 3 is a block diagram which illustrates a cross-section of the glove for wirelessly reading the wireless identification tag according to one embodiment of the invention.

While FIGS. 2A and 2B illustrate the reader/writer module 108, the antenna 106, and the pressure sensors 104, on the outside of the glove 102, alternate embodiments may provide one or more of the components 104, 106, 108 embedded within layers of the glove. For example, FIG. 3 is a block diagram which illustrates a cross-section of the glove 102 according to one embodiment of the invention. The glove 102 may have an outer layer 302, a conductive layer 304, and an inner layer 306. In one embodiment, the conductive layer 304 may include pieces of conductive fabric, wires, or a ribbon cable which may be used to provide power to components of the glove 102 and transmit data and/or signals to and from components of the glove 102. The pressure sensors 104, the reader/writer module 108, and/or the antenna 106, may be embedded within the conductive layer 304. Although one embodiment of the glove layers 302, 304, 306 is depicted, one skilled in the art should recognize that there are various ways of constructing the glove 102, including using multiple layers of conductive fabric in the glove 102 instead of or in addition to wires or a single layer of conductive fabric.

Wireless Identification Tag Placement

Figure 4:
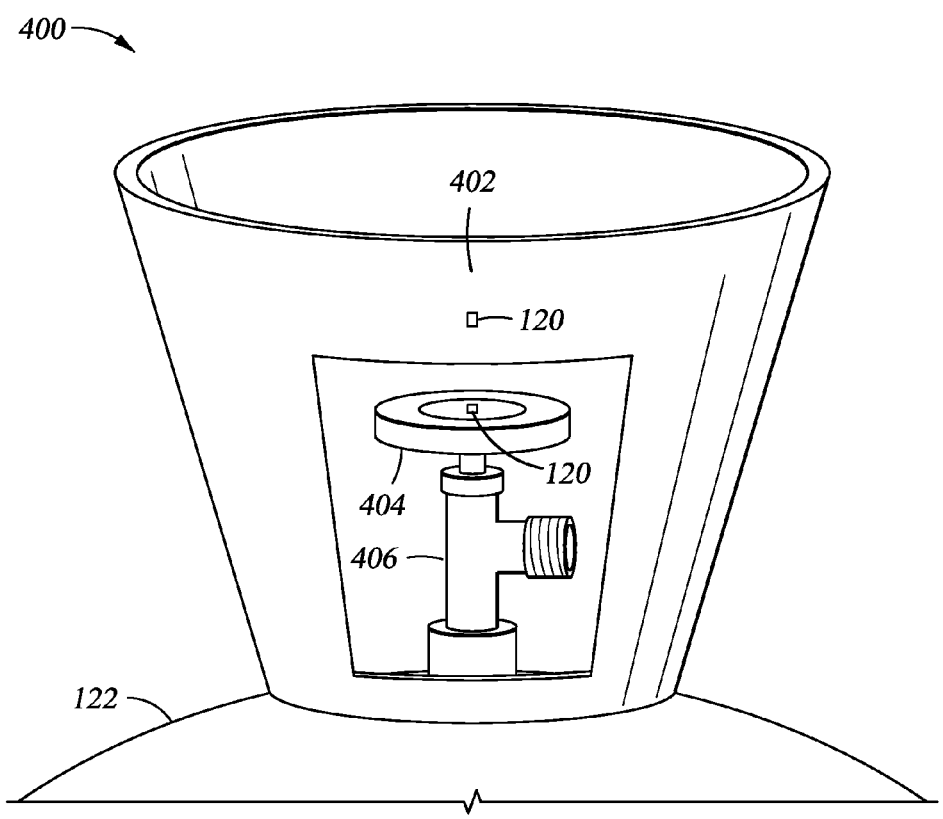
FIG. 4 is a block diagram which illustrates a gas cylinder tagged with a wirelessly readable electronic tag according to one embodiment of the invention.
Figure 5:
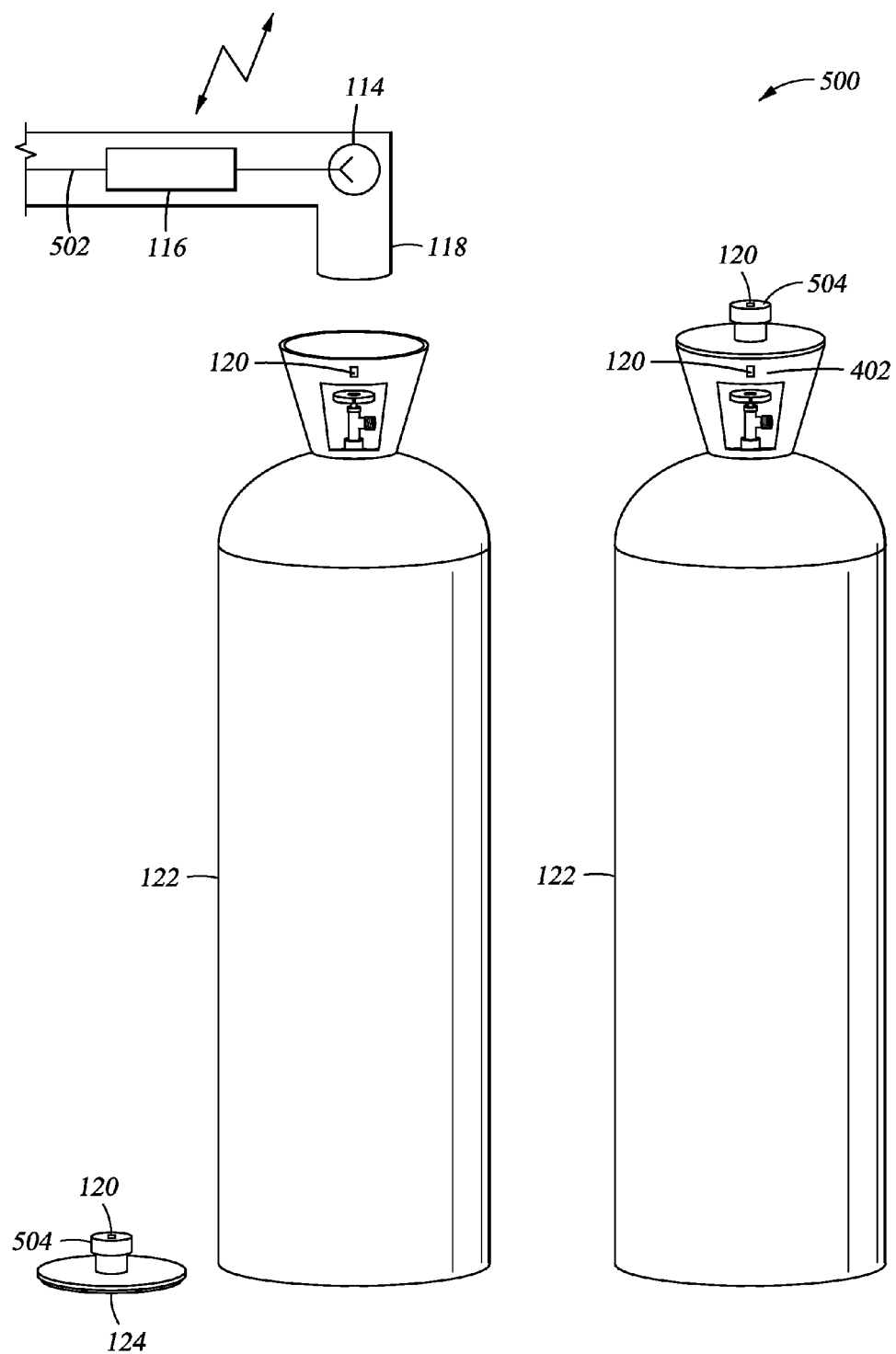
FIG. 5 is a block diagram which illustrates a gas cylinder with a cap tagged with a wirelessly readable electronic tag and a gas cylinder with a removed cap according to one embodiment of the invention.

FIG. 4 is a block diagram which illustrates a gas cylinder 122 tagged with a wirelessly readable electronic tag 120 according to one embodiment of the invention, and FIG. 5 is a block diagram which illustrates a gas cylinder 122 with a cap 124 tagged with a wirelessly readable electronic tag 120 and a gas cylinder 122 with a removed cap 124 according to one embodiment of the invention.

In FIG. 4, wireless identification tags 120 are depicted on the gas cylinder handle 402 and on the gas cylinder valve 404 that controls the flow of gas out of the gas cylinder 122 through the gas cylinder pipe 406. Optionally, as depicted in FIG. 5, the wireless identification tag 120 may be placed on the handle 504 of the gas cylinder cap 124. By placing the wireless identification tag 120 on or near the handle 504 of the gas cylinder top or on or near the gas cylinder handle 402, the wireless identification tag 120 may be positioned so that the reader/writer module 108 in the glove 102 may read the wireless identification tag 120 when the pressure sensor 104 detects a pressure due to the user 112 grasping either the handle 504 of the gas cylinder cap or the gas cylinder handle 402.

As depicted in FIG. 5, a wireless identification tag reader/writer 116 may also be used to read wireless identification tag data via an antenna 114 built into a nozzle 118 used when filling a gas cylinder 122. As described above, the wireless identification tag reader/writer 116 and antenna 114 may also be used to write information to the wireless identification tag 120 such as the gas cylinder product identification number, gas cylinder fill date, gas quality, gas type, and gas cylinder test date. The wireless identification tag reader/writer 116 may be battery powered, or may be wired 502 to a power source. The wireless identification tag reader/writer 116 may communicate with the central database server 128 through the wireless interface 132, or may be wired directly into the network 170.

In one embodiment, a wireless identification tag 120 may also be placed on a rack 130 for holding gas cylinders to provide further automation while tracking product shipments with the reader/writer module 108 in the glove 102. For example, when a user 112 opens a door on the rack 130, the portable computing device 110, or other computer system, may recognize that the wireless identification tag 120 read was on a rack 130. Consequently, the portable computing device 110 may associate all gas cylinders 122 corresponding to subsequent wireless identification tags 120 with the rack 130. This association may continue until the user 112 closes the door on the rack 130, and the wireless identification tag 120 corresponding to the rack 130 is again read by the reader/writer module 108 in the user's glove 102.

In one embodiment, when the user 112 of the glove 102 moves the rack 130 of gas cylinders 122, the reader/writer module 108 may detect the rack 130. The user 112 may update information about the rack 130 in the portable computing device 110, which in turn may cause the information about the gas cylinders 122 on the rack 130 to be updated. Such information about the rack 130 and cylinders 122 may include location, date of delivery, and customer identification.

In FIGS. 4 and 5, possible locations for wireless identification tag 120 placement are shown. However, one skilled in the art will recognize that wireless identification tags may be placed anywhere on the gas cylinder 122 or any other product tagged by a wireless identification tag 120.

Reading Wireless Identification Tags

Figure 6A:
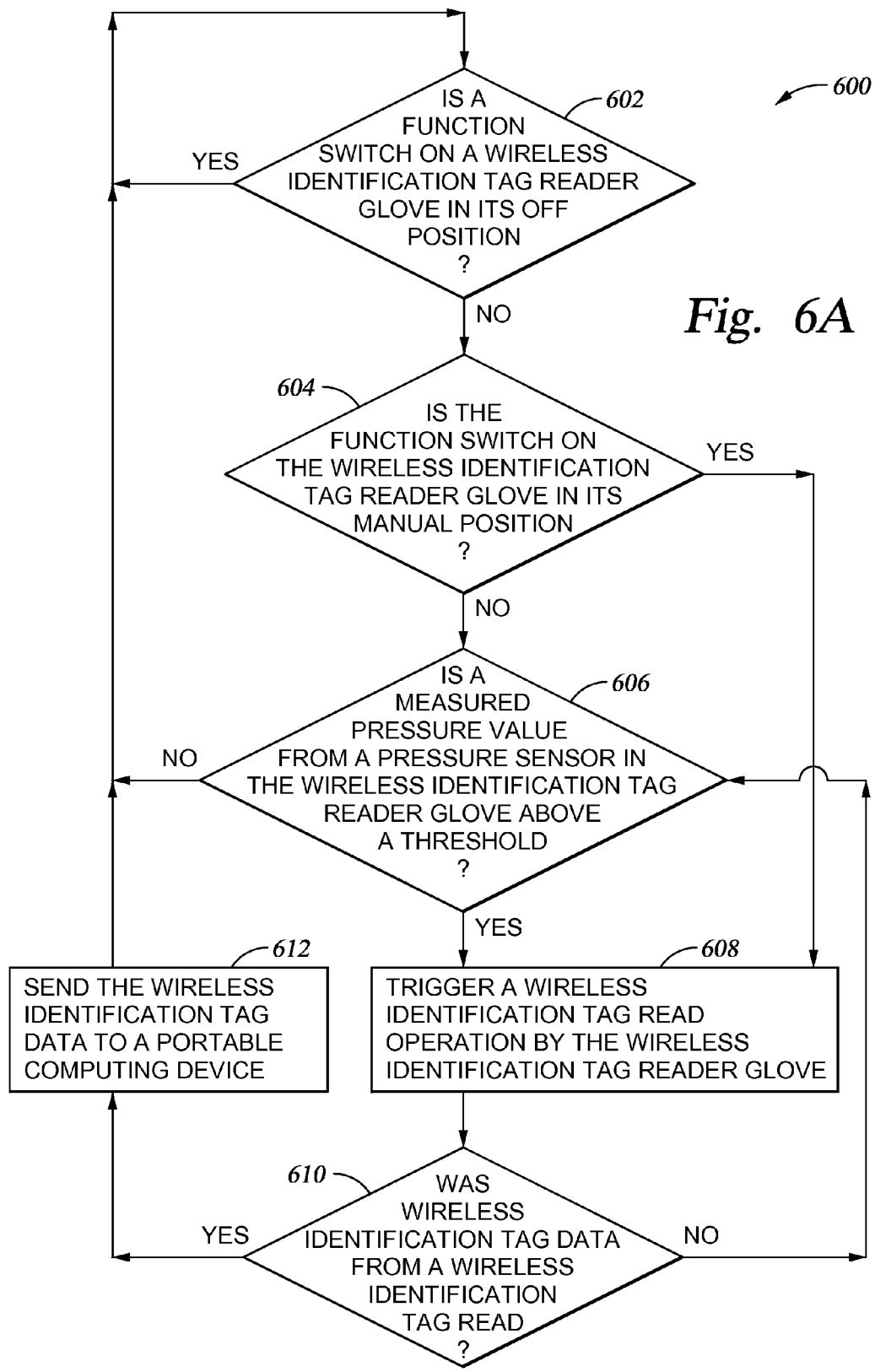
FIG. 6A is a flow diagram depicting a process for reading a wireless identification tag using a switch and a pressure sensor according to one embodiment of the invention.

FIG. 6A is a flow diagram depicting a process 600 for reading a wireless identification tag 120 using a switch 202 and a pressure sensor 104 according to one embodiment of the invention. The process 600 may begin at step 602 where the reader/writer module 108 determines if the switch 202 is in the off position. If the switch 202 is not in the off position, the process 600 proceeds to step 604.

In step 604 the reader/writer module 108 checks to see if function switch 202 is in its manual position. If the switch 202 is set to manual, the process 600 skips to step 608. If switch 202 is set to automatic, the process 600 proceeds to step 606.

In step 606 the reader/writer module 108 checks to see if a pressure value measured by the pressure sensor 104 is above a threshold pressure value. If the measured pressure value is greater than the threshold pressure value, the process 600 proceeds to step 608 where the reader/writer module control circuitry 214 on the reader/writer module 108 is activated by turning the antenna 106 on for a set period of time to read a wireless identification tag 120. If the pressure value measured by the pressure sensor 104 is not greater than a threshold pressure value, the process 600 returns to step 602.

In step 610, a determination is made whether valid wireless identification tag data was read. For example, the validity of the data may be established by any of various methods, including determining a checksum value from the wireless tag data, or requiring redundant reading of the same information. If the data is not valid, or if no tag is present, the process 600 returns to step 606. If the wireless identification tag data is valid, the process 600 proceeds to step 612, where the reader/writer module 108 sends the wireless identification tag data to the portable computing device 110 via the transceiver 204. The process 600 may then repeat, returning to step 602.

Figure 6B:
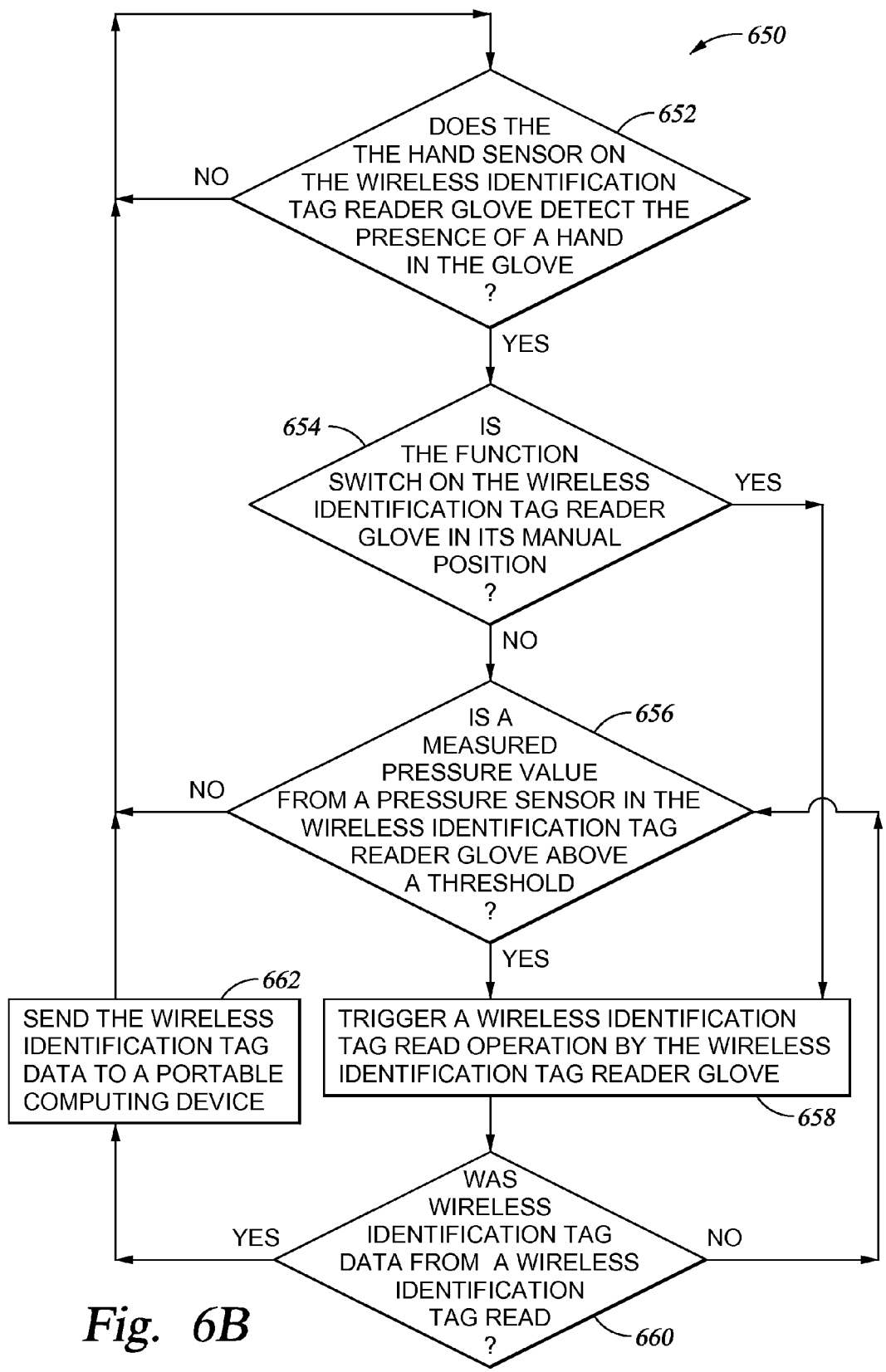
FIG. 6B is a flow diagram depicting an alternate process for reading a wireless identification tag using a switch, a sensor, and a pressure sensor according to one embodiment of the invention.

FIG. 6B depicts an alternate process 650 for reading a wireless identification tag 120 using a switch 202, a sensor 222, and a pressure sensor 104 according to one embodiment of the invention. The process 650 may begin at step 652 where the reader/writer module 108 determines from the sensor 222 if a hand of a user 112 is in the glove 102. When the hand of the user 112 is in the glove 102, the process 650 may proceed to step 654.

In step 654 the reader/writer module 108 checks to see if function switch 202 is in its manual position. If the switch 202 is set to manual, the process 650 skips to step 658. If switch 202 is set to automatic, the process 650 proceeds to step 656.

In step 656 the reader/writer module 108 checks to see if a pressure value measured by the pressure sensor 104 is above a threshold pressure value. If the measured pressure value is greater than the threshold pressure value, the process 650 proceeds to step 658 where the reader/writer module control circuitry 214 on the reader/writer module 108 is activated by turning the antenna 106 on for a set period of time to read a wireless identification tag 120. If the pressure value measured by the pressure sensor 104 is not greater than a threshold pressure value, the process 650 returns to step 652.

In step 660, a determination is made whether valid wireless identification tag data was read. For example, the validity of the data may be established by any of various methods, as described above. If the data is not valid, or if no tag is present, the process 650 returns to step 656. If the wireless identification tag data is valid, the process 650 proceeds to step 662, where the reader/writer module 108 sends the wireless identification tag data to the portable computing device 110 via the transceiver 204. The process 650 may then repeat, returning to step 652.

One skilled in the art should in the art should recognize that the processes described above are merely exemplary and that there are various alternate ways of implementing the processes 600, 650 of FIGS. 6A and 6B.

Processing Wireless Identification Tag Information

Figure 7:
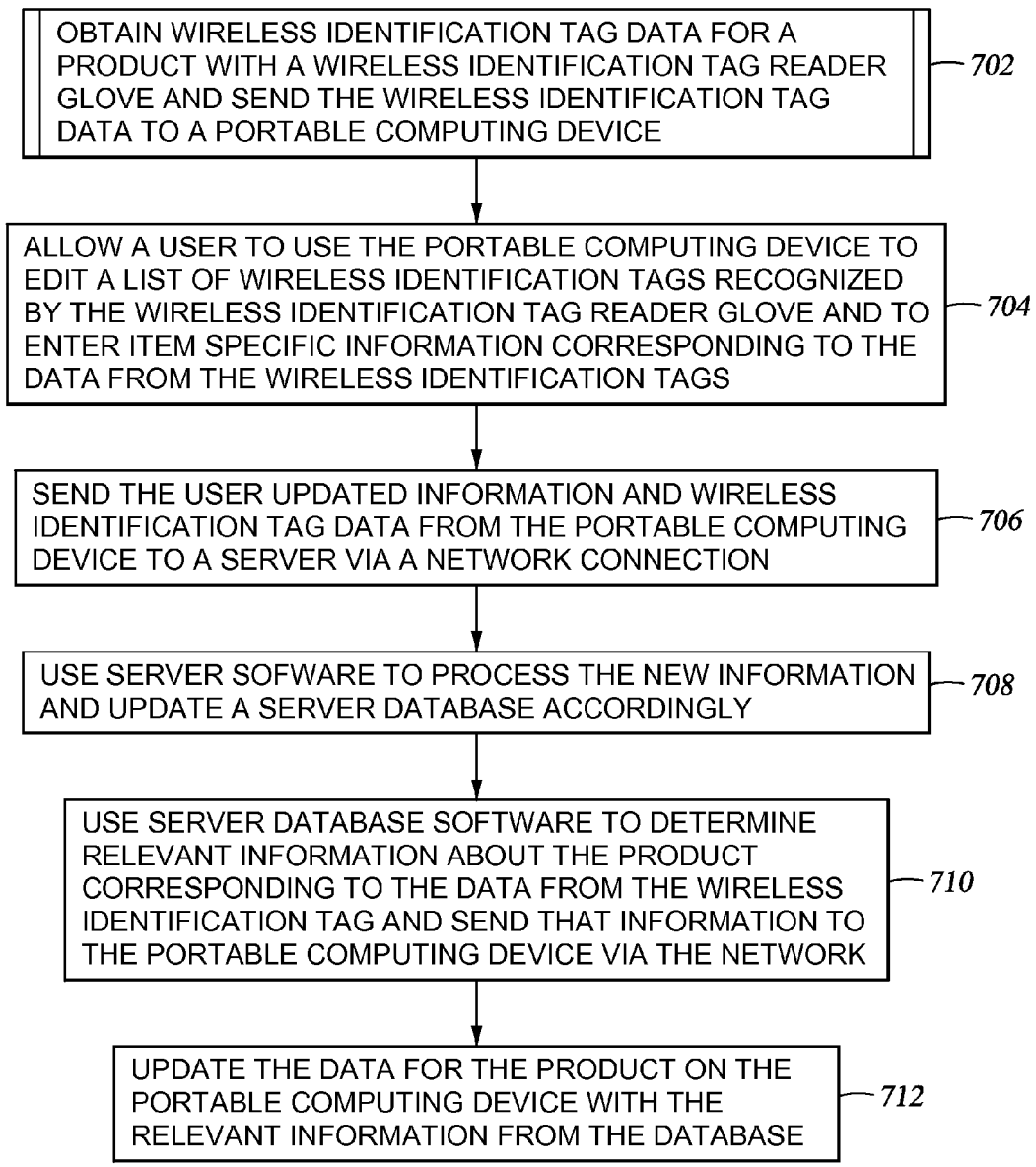
FIG. 7 is a flow diagram depicting a process for transferring the data associated with the glove for wirelessly reading the wireless identification tag according to one embodiment of the invention.

FIG. 7 is a flow diagram depicting a process 700 for processing the data associated with the glove 102 for wirelessly reading the wireless identification tag 120 according to one embodiment of the invention. The process 700 may begin at step 702, where wireless identification tag data for a product is obtained with a reader/writer module 108 in or on a glove 102, and the wireless identification tag data is sent to a portable computing device 110. Step 702 may include performance of the steps described above with respect to process 600 in FIG. 6A or process 650 in FIG. 6B.

In step 704, a user of the portable computing device 110 may edit and add data to a list of wireless identification tags 120 recognized by the reader/writer module control circuitry 214 in the glove 102 and enter item specific information corresponding to the data from the wireless identification tags 120. The portable computing device 110 may send the user updated information and wireless identification tag data from the portable computing device 110 to a central database server 128 via a network 170 in step 706.

In step 708, the central database server 128 may use a product management application 148 to process the new information and update data 146 in a server database accordingly. In step 710, the product management application 148 on the central database server 128 may determine relevant information about the product corresponding to the data from the wireless identification tag 120 and may send that information to the portable computing device 110 via the network 170. For example, if the product were the gas cylinder 122, relevant information retrieved from the central database server 128 and sent to the personal computing device 110 may include the date of the next scheduled gas cylinder safety test, the type of gas in the gas cylinder 122, and any safety and handling information associated with the gas cylinder 122.

In step 712, the data on the portable computing device 110 for the product corresponding to the wireless identification tag 120 may be updated with the relevant information from the database on the central database server 128 and may display such relevant information.

In one embodiment, the relevant information may cause the portable computing device 110 to alert the user 112 to further actions required by the user 112 on the product. Such actions may include placing the glove 102 over the wireless identification tag 120 so that the new and relevant information may be written to the wireless identification tag 120 from the reader/writer module 108. Other actions may include removing the product from circulation, taking the product in for testing, and loading the product onto a specific rack 130.

One skilled in the art should recognize that there are various ways to transfer and manipulate the wireless tag data read by the reader/writer module 108 in the glove 102, and that any embodiments provided above are merely illustrative.

Portable Computing Device

As described above, the reader/writer module 108 may be used to transmit wireless identification tag data to the portable computing device 110. In one embodiment, the reader/writer module 108 may transmit wireless identification tag data to the portable computing device 110 via the transceiver 204 after each read operation.

In another embodiment, the reader/writer module 108 may store wireless identification tag data until a pause in reader/writer module control circuitry 214 activity. During the pause in reader/writer module control circuitry 214 activity, the reader/writer module 108 may send the data obtained from a plurality of successful read operations of wireless identification tags 120 to the portable computing device 110 via the transceiver 204.

Optionally, the reader/writer module 108 may not be in continual communication with the portable computing device 110. Therefore, the reader/writer module 108 may store wireless identification tag data until a direct connection to the portable computing device 110, wired or wireless, can be made. Examples of the connection include connection by a universal serial bus (USB) cable, infrared signal via infrared ports, or Bluetooth.

Figure 8:
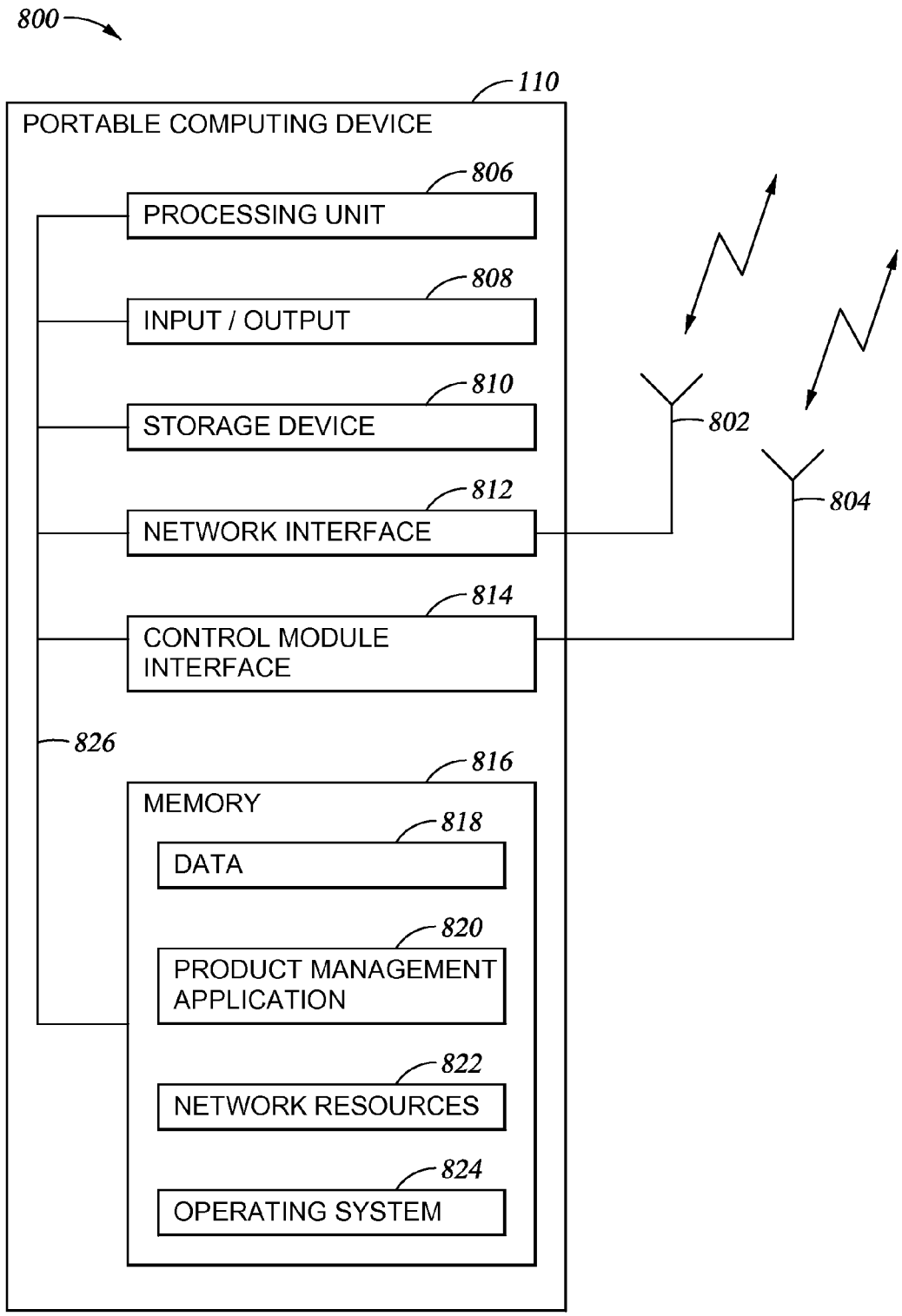
FIG. 8 is a block diagram which illustrates a portable computing device according to one embodiment of the invention.

FIG. 8 is a block diagram which illustrates a portable computing device 110 according to one embodiment of the invention. Processing in the portable computing device 110 may be performed by a processing unit 806. The processing unit 806 may process programs in a memory 816 including a product management application 820, a network resources application 822, and an operating system 824 for the portable computing device 110. The processing unit 806 may also process data 818 and other programs or information. Such data and programs may also be stored in a storage device 810 such as a hard drive or other computer-readable medium (e.g., a compact disc or read-only memory).

The portable computing device 110 may utilize an input/output interface 808 to receive input from the user 112. The portable computing device 110 may utilize a network interface 812 to request and/or receive data from the network 170 via a network link 802. Similarly, the portable computing device 110 may utilize a control module interface 814 to request and/or receive data from the transceiver 204 of reader/writer module 108 on the glove 102 via a local link 804. The local link 804 may communicate with transceiver 204 via a wireless protocol, like Bluetooth, IEEE 802.11, or infrared technologies. Alternatively, the local link 804 may communicate with transceiver 204 via a wired connection. Internal components of the portable computing device 110 may communicate via a data bus 826.

Figure 9:
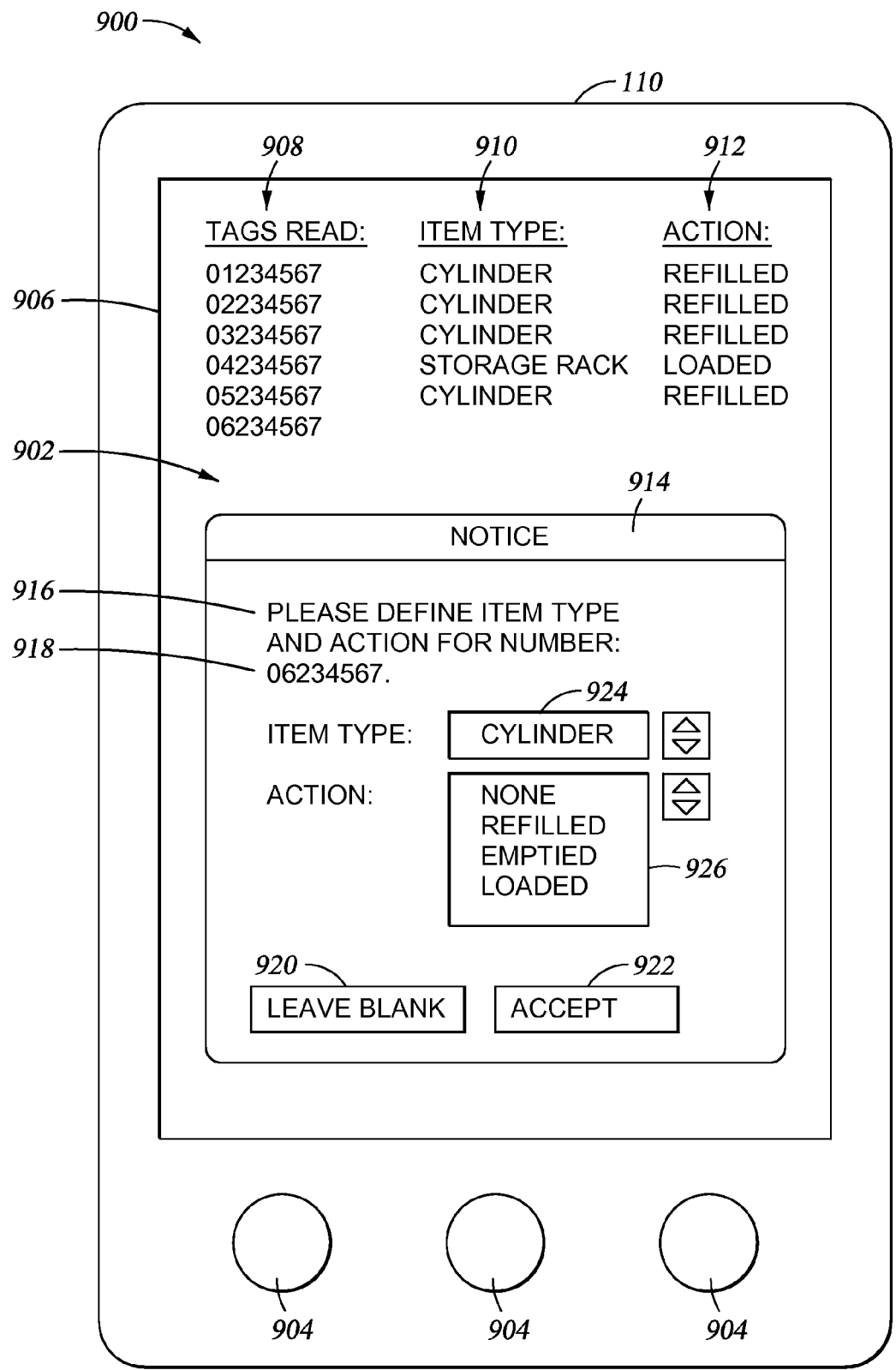
FIG. 9 is a block diagram which illustrates a graphical user interface (GUI) of the portable computing device according to one embodiment of the invention.

FIG. 9 is a block diagram which illustrates a graphical user interface (GUI) 902 of the portable computing device 110 according to one embodiment of the invention. The portable computing device 110 may have buttons 904 and/or a touch screen 906 so that the user 112 of the reader/writer module 108 on the glove 102 may enter additional information about the product associated with the wireless identification tag 120 read by the reader/writer module 108 on the glove 102 as described above.

In one embodiment, such additional information may include the type of product tagged by the wireless identification tag 120, the action performed on the product, and/or the location where the product was read by the user 112 with the glove 102. In another embodiment, the portable computing device 110 may automatically add additional information about the product associated with the wireless identification tag 120 read by the user 112 with the glove 102. Such information could include coordinate data from the Global Positioning System (GPS), the time the wireless identification tag 120 was read by the reader/writer module 108, and/or identification of the user 112 of the glove 102.

This additional information may be entered by using a GUI 902 on the portable computing device 110. In one embodiment of the invention, the GUI 902 contains a table with several fields, including tags read by the wireless identification tag reader 908, type of product scanned by the wireless identification tag reader 910, and action performed on the product 912. The user 112 may use the portable computing device 110 to send wireless identification tag data and any additional information to the central database server 128. However, if the user 112 tries to send this data before entering all the required information, a notice 914 may appear to inform the user 112 of the missing information. The notice 914 may describe the missing information 916, may indicate the wireless identification tag that is missing required data 918, may provide fields for updating the missing information 924, 926, and/or may give the user on screen buttons 920, 922 for accepting changes to the additional tag data 922 or leaving the record blank 920.

In one embodiment, the portable computing device 110 may provide auditory feedback to the user 112 when wireless identification tag data is received. For example, the auditory feedback may be a short tone signifying a successful read of a wireless identification tag 120, or may be speech identifying the read operation and details about the wireless identification tag 120. Such feedback may enable the user 112 to more quickly identify misreads and correct errors as they occur. In some cases, the auditory feedback may be provided via a speaker embedded in the portable computing device 110. Optionally, the auditory feedback may be provided via other means, such as headphones attached to the portable computing device 110.

One skilled in the art will recognize that the portable computing device 110 and GUI 902 of FIG. 9 are only examples, and may be configured in any appropriate manner. For example, in some cases the portable computing device 110 may be configured to transmit wireless information tag data via the transceiver 204 to the central database server 128 without user interaction.

Wireless Identification Tag Data Tracking

As was described above in reference to FIG. 7, step 706, the portable computing device may send wireless identification tag data read by the reader/writer module 108 and the additional information entered by the user 112 of the portable computing device 110 to a central database server 128. The central database server 128 may include a database such as, for example, the database 1002 depicted in FIG. 10.

The database 1002 contains information that may be stored for a wirelessly readable electronic tag according to one embodiment of the invention. The information may be stored on the central database server 128 and/or written to the wireless identification tag 120. The data may includes a wireless tag identification number 1004, gas cylinder identification number 1006, date the gas cylinder was refilled 1008, type of gas in the gas cylinder 1010, quality of gas in the gas cylinder 1012, date the gas cylinder was tested 1014, and additional information 1016 input by the user of the reader/writer module control circuitry 214 on the glove 102 after scanning the gas cylinder with the reader/writer module control circuitry 214.

In one embodiment, the database 1002 may include information on the physical location of the wireless identification tag 120 when it was read by the reader/writer module control circuitry 214. The physical location may be obtained in many ways. For example, the portable computing device 110 or the reader/writer module 108 on the glove 102 may use GPS or triangulation to determine the exact location where a wireless identification tag was read. Such data may be recorded by the portable computing device 110 and transmitted, along with the wireless identification tag data, to the central database server 128. Also, location may be obtained from knowing the location of the wireless interface 132 used by the portable computing device 110 to send wireless identification tag data to the network 170. Location data can be any of various location representation forms including latitude and longitude coordinates, address information, and/or the name of a facility where a wireless identification tag 120 was read by the reader/writer module 108 in the glove 102.

For example, the user 112 may read wireless identification tag data with the reader/writer module 108 in the glove 102 that may be subsequently transmitted wirelessly from the reader/writer module 108 to the a wireless interface 132. Since the wireless interface 132 may be known to be in a certain location, the relative location of the wireless identification tag 120 may be obtained from the corresponding known location of the wireless interface 132. Furthermore, the portable computing device 110, the central database server 128, or the workstation 126 may be capable of determining a correlation between types of location data. For example, from latitude and longitude coordinate data, a corresponding address of the tagged product may be obtained.

Tracking Glove Usage

In one embodiment, the reader/writer module 108 in the glove 102 may also be used to track the productivity of the user 112. For example, the database 1002 may maintain information on the user of the reader/writer module 108 in the glove 102, including a total usage time of the reader/writer module 108 by the user 112, a total number of wireless identification tags read by the reader/writer module 108 while under control of the user 112, or any other data that may be useful in determining the productivity of the user 112.

To relate user productivity to a specific user 112, the identity of the user 112 may be recorded. In one embodiment, the user's identity may be determined from login information on the portable computing device 110. For example, when the user places the glove 102 on a hand, the sensor 222 may detect the presence of the hand, causing the reader/writer module 108 to send a message to the portable computing device 110. The portable computing device 110 may use the message from the reader/writer module 108 to initiate a request to the user for login information. Optionally, the identity of a user 112 may be determined by reading a fingerprint of the user 112, reading an identification card of the user 112, and/or reading a wireless identification tag belonging to the user 112.

In another embodiment, the reader/writer module 108 in the glove 102 may have a unique identification number that may be known to be associated with a single user 112. When a wireless identification tag 120 is read by the reader/writer module 108 in the glove 102, the portable computing device 110 or the central database server 128 may correlate the identification number of the reader/writer module 108 with the user 112 of the glove 102 according to the known association.

Similarly, the portable computing device 110 may have a unique identification number that may be known to be associated with a single user 112. When the portable computing device 110 transmits the wireless identification tag data to the central database server 128, the central database server 128 may correlate the identification number of the portable computing device 110 with the identification of the user 112 according to the known association.

One skilled in the art will recognize that the identification techniques described above are merely representative, and do not encompass the numerous ways to identify a user 112.

Exemplary System Usage

To further clarify how the present invention may be used to improve tracking of products in a product management system, the following example of a gas cylinder 122 management system is presented.

In one embodiment, when a gas cylinder 122 is filled at a gas cylinder filling station, the filling station may have a wireless identification tag reader/writer 116 and its associated antenna 114 built into the filling nozzle 118. While the gas cylinder 122 is being filled, the wireless identification tag reader/writer 116 may read the wireless identification tag 120 on the gas cylinder 122. The wireless identification tag reader/writer 116 may transmit the wireless identification tag data to a central database server 128 that may process the wireless identification tag data and return updated data to the wireless identification tag reader/writer 116.

In one embodiment, the wireless identification tag reader/writer 116 may write this updated data to the wireless identification tag 120 on the gas cylinder 122. The updated information may include, but is not limited to, the type of gas in the gas cylinder 122, the date the gas cylinder 122 was filled, the amount of gas in the gas cylinder 122, and the location of the gas cylinder 122 when filled.

Before beginning work, a user 112 may put on a pair of gloves (for example, as may be required by standard safety procedures). If one of those gloves is the glove 102 as described above, sensor 222 in the glove 102 may sense that the user 112 is wearing the glove and may activate the reader/writer module 108.

In one embodiment, once the gas cylinder 122 has been filled, a user 112 may remove the gas cylinder 122 from the filling station. When the user 112 moves the gas cylinder 122, a pressure sensor 104 in the glove 102 of the user may measure a pressure value of a pressure exerted on the glove 102. The wireless identification tag reader/writer module 108 in the glove 102 may determine that the measured pressure value is greater than a threshold pressure value, and consequently activate an antenna 106 in the glove 102 for wireless communication with the wireless identification tag 120.

In one embodiment, if the reader/writer module 108 successfully reads wireless identification tag data from the wireless identification tag 120, the wireless identification tag data is subsequently sent to a portable computing device 110 worn by the user 122, as described above. The portable computing device 110 may allow the user 112 to enter additional information about the gas cylinder 122 tagged by the wireless identification tag 120 read by the reader/writer module 108.

In one embodiment, the wireless identification tag data as well as any additional information entered by the user 112 may be transmitted from the portable computing device 110 to the central database server 128. The central database server 128 may process the wireless identification tag data as well as any additional information entered by the user 112 and return updated data to portable computing device 110. The updated information may include, but is not limited to, type of gas in the gas cylinder 122, date the gas cylinder 122 was last filled, amount of gas in the gas cylinder 122, action to be performed on the gas cylinder 122, and location of the gas cylinder 122.

The portable computing device 110 may respond to the updated data in a number of ways, including notifying the user 112 that the gas cylinder should 122 be placed on a particular gas cylinder rack 130 for delivery of the filled gas cylinder 122 to a customer. Additionally, the portable computing device 110 may provide a map and address to the delivery location.

In one embodiment, the wireless identification tag 120 may be placed on a gas cylinder rack 130. When the user 112 opens a door on the rack 130, the portable computing device 110 may recognize that the wireless identification tag 120 read by the reader/writer module 108 was located on the rack 130. Consequently, the portable computing device 110 may associate all gas cylinders 122 corresponding to subsequent wireless identification tags 120 with the rack 130. This association may continue until the user 112 closes the door on the rack 130, and the wireless identification tag 120 corresponding to the rack 130 is again read by the reader/writer module 108 in the user's glove 102.

In one embodiment, when the user 112 delivers the gas cylinder 122 to the customer, a process may occur similar to when the user 112 removed the gas cylinder 122 from the filling station. For example, the user 112 of the reader/writer module 108 in the glove 102 may enter additional information into the portable computing device 110 identifying that the gas cylinder 122 is being delivered to the customer. The portable computing device 110 may have a built in GPS receiver that determines the customer's location (e.g., latitude and longitude coordinates), and sends that location information, along with the wireless identification tag data and any additional information added by the user 112 of the portable computing device 110, to the central database server 128. In this manner, not only may a record of products on the central database server 128 be seamlessly updated, but accurate tracking of the location of a product may also be maintained.

In one embodiment, once the customer has used all the gas in the gas cylinder 122, the user 112 may travel to the customer's location to retrieve the gas cylinder 122. When the user moves the gas cylinder 122, a process may occur similar to when the user 112 removed the gas cylinder 122 from the filling station. Upon retrieving the cylinder 122 and reading the wireless identification tag 120 as described above, the user 112 of the reader/writer module 108 in the glove 102 may enter additional information into the portable computing device 110 identifying that the gas cylinder 122 is being retrieved from the customer.

In one embodiment, the portable computing device 110 sends this additional user entered information, along with the wireless identification tag data from the wireless identification tag 120 on the gas cylinder 122, to the central database server 128. An application running on the central database server 128 may recognize that the customer needs a new gas cylinder 122, and may automatically re-order a gas cylinder 122 for the customer.

In one embodiment, the user 112 may return the gas cylinder 112 to the filling station, and the sequence described above may begin again.

One skilled in the art will recognize that the preceding example is only a representation of one way the wireless tag reader/writer module 108 in a glove 102 may be used to improve the tracking of products in a product management system.

CONCLUSION

Embodiments of the present invention are described above with respect to a reader/writer module 108 in or on a glove 102 worn on the hand of a user 112. However, embodiments of the present invention are not limited to this or other glove-based embodiments. For example, the antenna 106 may be attached to a ring worn by the user 112, the pressure sensor 104 may be placed in a shoe worn by the user 112, and/or the reader/writer module 108 may be worn on a belt of the user 112.

Furthermore, the reader/writer module 108 in or on the glove 102 and the portable computing device 110 have been described above as separate entities. However, embodiments of the present invention are not limited to this configuration. The reader/writer module 108 and the portable computing device 110 may be a single entity, capable of wirelessly reading a wireless identification tag 120 and accepting additional information about the product associated with the wireless identification tag 102 from the user 112.

Processes and apparatus for practicing the present invention have been described. It will be understood and readily apparent to the skilled artisan that many changes and modifications may be made to the above-described embodiments without departing from the spirit and the scope of the present invention. The foregoing is illustrative only and that other embodiments of the integrated processes and apparatus may be employed without departing from the true scope of the invention defined in the following claims.

What is claimed is:

1. A method for reading information from a signal-emitting device, comprising:
   a) providing an electronic reading device mounted to a body-worn harness adapted to be worn on a body of a user;
   b) detecting a predefined physical configuration assumed by at least a portion of the body by determining that a pressure value measured via a pressure sensor connected to the body-worn harness is above a threshold pressure value; and
   c) in response to detecting the predefined physical configuration, activating the electronic reading device, wherein, upon being activated, the electronic reading device is configured to receive a signal from the signal-emitting device, the signal containing data pertaining to a physical object associated with the signal-emitting device.

2. The method of claim 1, wherein the body-worn harness is adapted to be worn on an extremity of the user.

3. The method of claim 1, wherein the body-worn harness is adapted to be worn on a hand of the user.

4. The method of claim 1, wherein the body-worn harness is adapted to be worn on a hand of a human being and wherein the predefined physical configuration is a grasping configuration of the hand assumed when the hand is engaged in lifting the physical object.

5. The method of claim 1, wherein the body-worn harness is a glove.

6. The method of claim 1, further comprising, upon receiving the signal from the signal-emitting device, transmitting data contained in the signal to a remote receiver.

7. A method for reading a wireless identification tag, comprising:
 a) measuring a pressure value via a pressure sensor connected to a hand-mounted device;
 b) determining if the pressure value measured via the pressure sensor is above a threshold pressure value; and
 c) if so, wirelessly reading tag data from the wireless identification tag via an antenna connected to the hand-mounted device.

8. The method of claim 7, wherein the hand-mounted device is a glove.

9. The method of claim 7, wherein the method further comprises determining if an activation switch for the hand-mounted device is in an on position, wherein the tag data is wirelessly read from the wireless identification tag only if the activation switch for the hand-mounted device is in the on position.

10. The method of claim 7, wherein the method further comprises determining the presence of a hand wearing the hand-mounted device with a hand sensor which automatically detects the presence of a hand, wherein the tag data is wirelessly read from the wireless identification tag only if the presence of the hand is detected.

11. The method of claim 7, wherein the wireless identification tag is a Radio Frequency Identification (RFID) tag.

12. The method of claim 7, wherein the antenna connected to the hand-mounted device is mounted between a first digit and a second digit of a hand of a user of the hand-mounted device.

13. The method of claim 7, wherein the pressure sensor is mounted on one or more of a thumb of a user, an index finger of the user, and a palm of a hand of the user.

14. The method of claim 7, wherein the method further comprises transferring wireless tag data from the hand-mounted device to a computing device, wherein the computing device is one of a personal digital assistant (PDA), a workstation computer, a server computer, and an equivalent computing device.

15. A tangible computer readable medium including instructions which, when executed by a processor, perform the method comprising:
 a) measuring a pressure value via a pressure sensor connected to a hand-mounted device;
 b) determining if the pressure value measured via the pressure sensor is above a threshold pressure value; and
 c) if so, wirelessly reading tag data from a wireless identification tag via an antenna connected to the hand-mounted device.

16. The tangible computer readable medium of claim 15, wherein the hand-mounted device is a glove.

17. The tangible computer readable medium of claim 15, wherein the method further comprises determining if an activation switch for the hand-mounted device is in an on position, wherein the tag data is wirelessly read from the wireless identification tag only if the activation switch for the hand-mounted device is in the on position.

18. The tangible computer readable medium of claim 15, wherein the method further comprises determining the presence of a hand wearing the hand-mounted device with a hand sensor which automatically detects the presence of a hand, wherein the tag data is wirelessly read from the wireless identification tag only if the presence of a hand is detected.

19. The tangible computer readable medium of claim 15, wherein the wireless identification tag is a Radio Frequency Identification (RFID) tag.

20. The tangible computer readable medium of claim 15, wherein the antenna connected to the hand-mounted device is mounted between a first digit and a second digit of a user of the hand-mounted device.

21. The tangible computer readable medium of claim 15, wherein the pressure sensor is mounted on one or more of a thumb of a user, an index finger of the user, and a palm of a hand of the user.

22. The tangible computer readable medium of claim 15, wherein the method further comprises transferring wireless tag data from the hand-mounted device to a computing device, wherein the computing device is one of a PDA, a workstation computer, a server computer, and an equivalent computing device.

23. A device comprising:
 a) a hand-mounted device with an antenna;
 b) a pressure sensor connected to the hand-mounted device; and
 c) circuitry configured to:
  i) measure a pressure value via the pressure sensor;
  ii) determine if the pressure value measured via the pressure sensor is above a threshold pressure value; and
  iii) if so, activate the antenna and wirelessly read tag data from a wireless identification tag.

24. The device of claim 23, wherein the hand-mounted device is a glove.

25. The device of claim 23, wherein the circuitry is further configured to determine if an activation switch for the hand-mounted device is in an on position, wherein the tag data is wirelessly read from the wireless identification tag only if the activation switch for the hand-mounted device is in the on position.

26. The device of claim 23, wherein the circuitry is further configured to determine the presence of a hand of a user wearing the hand-mounted device with a hand sensor which automatically detects the presence of a hand, wherein the tag data is wirelessly read from the wireless identification tag only if the presence of a hand is detected.

27. The device of claim 23, wherein the wireless identification tag is a Radio Frequency Identification (RFID) tag.

28. The device of claim 23, wherein the antenna connected to the hand-mounted device is mounted between a first digit and a second digit of a user of the hand-mounted device.

29. The device of claim 23, wherein the pressure sensor is mounted on one or more of a thumb of a user, an index finger of the user, and a palm of a hand of the user.

30. The device of claim 23, wherein the circuitry is further configured to transfer wireless tag data from the hand-mounted device to a computing device, wherein the computing device is one of a PDA, a workstation computer, a server computer, and an equivalent computing device.

31. A method for product management, comprising:
   a) activating a hand-mounted wireless identification tag reader in response to a pressure exerted against a pressure sensor of the hand-mounted wireless identification tag reader; and
   b) wirelessly reading identification tag data from an identification tag located in a handle portion of a product using the activated hand-mounted wireless identification tag reader.

32. A device comprising:
   a) a hand-mounted device for reading a wireless identification tag, wherein the hand mounted device comprises a hand sensor configured to determine whether a user is wearing the hand mounted device; and
   b) an antenna connected to the hand-mounted device for performing communication with the wireless identification tag, wherein the antenna is positioned between a first digit of the user's hand and a second digit of the user's hand.

33. A hand-mounted device comprising:
   a) a hand sensor;
   b) a wireless tag reader; and
   c) circuitry configured to:
      i) determine, using the hand sensor, whether a user is wearing the hand-mounted device; and
      ii) if the user is wearing the hand-mounted device, activating the wireless tag reader, wherein the wireless tag reader, when activated, is configured to automatically read wireless tag data from a wireless identification tag placed within a threshold distance from the wireless tag reader.

34. The hand-mounted device of claim 33, wherein the hand mounted device further comprises a pressure sensor and wherein the circuitry is further configured to:
   iii) measure a pressure value via the pressure sensor;
   iv) determine if the pressure value measured via the pressure sensor is above a threshold pressure value; and
   v) if so, automatically read wireless tag data from the wireless identification tag.

35. A hand-mounted device comprising:
   a) a pressure sensor, wherein the pressure sensor is mounted on one or more of the digits of a hand of a user;
   b) a wireless tag reader; and
   c) circuitry configured to:
      i) measure a pressure value via the pressure sensor;
      ii) determine if the pressure value measured via the pressure sensor is above a threshold pressure value; and
      iii) if so, read wireless tag data from a wireless identification tag.

36. A method for reading information from a signal-emitting device, comprising:
   a) receiving, from a signal-emitting device, an identification value corresponding to a product, the signal-emitting device being activated in response to an electronic reading device reading a RF ID tag disposed on a gas cylinder, wherein the electronic reading device is mounted to a body-worn harness adapted to be worn on a body of a user and wherein the electronic reading device is configured to read the RF ID tag upon determining that a pressure value measured via a pressure sensor connected to the body-worn harness is above a threshold pressure value;
   b) transmitting the identification value and tracking data corresponding to the product to a computer system configured to record the tracking data; and
   c) storing the identification value and tracking data corresponding to the product in a memory device of the computer system.

37. The method of claim 36, wherein the tracking data includes location data for the product.

38. The method of claim 37, wherein the tracking data includes action data indicating an action performed with respect to the product at a location indicated by the location data.

39. The method of claim 38, wherein the action data is one of filling the gas cylinder, delivering the gas cylinder, and retrieving the gas cylinder.

40. The method of claim 36, further comprising:
   receiving, from the computer system, a response including retrieved data corresponding to the product.

41. The method of claim 40, wherein the retrieved data corresponding to the product indicates an action to be performed with respect to the product.

42. The method of claim 41, wherein the action to be performed with respect to the product is one of filling the gas cylinder, delivering the gas cylinder, and retrieving the gas cylinder.

* * * * *